E. H. HITCHCOCK.
COMBINED SEEDER AND FERTILIZER DISTRIBUTER.
APPLICATION FILED MAY 3, 1917.
1,269,814.
Patented June 18, 1918.
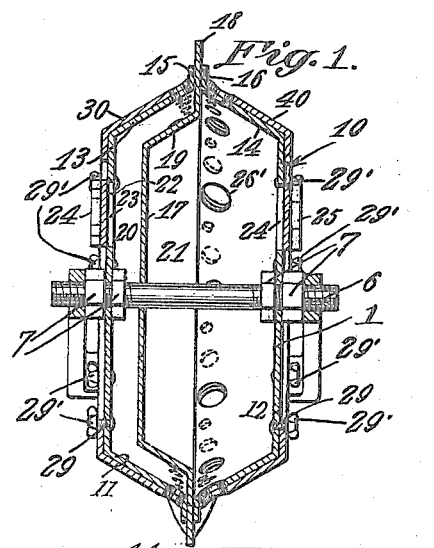
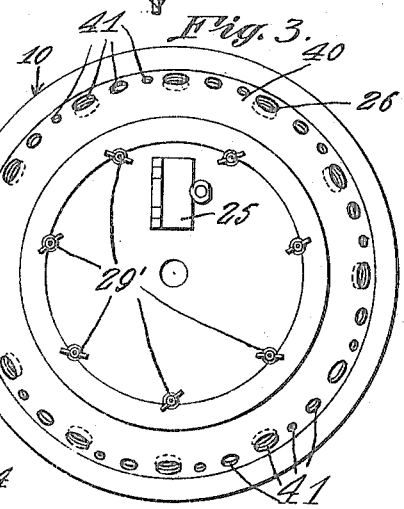
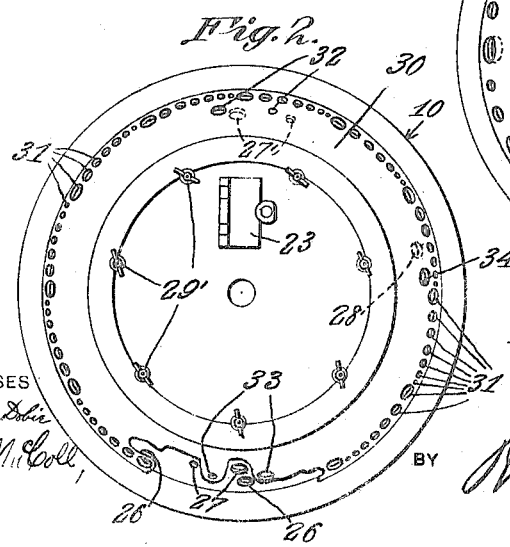
Ervin H. Hitchcock, INVENTOR
WITNESSES
BY
ATTORNEY

UNITED STATES PATENT OFFICE.

ERVIN H. HITCHCOCK, OF WABUN, NEW ONTARIO, CANADA, ASSIGNOR OF ONE-HALF TO GEORGE A. DUKELOW, OF WABUN, NEW ONTARIO, CANADA.

COMBINED SEEDER AND FERTILIZER-DISTRIBUTER.

1,269,814.      Specification of Letters Patent.      Patented June 18, 1918.

Application filed May 3, 1917. Serial No. 166,239.

*To all whom it may concern:*

Be it known that I, ERVIN H. HITCHCOCK, a citizen of the United States, residing at Wabun, in the Province of New Ontario and Dominion of Canada, have invented certain new and useful Improvements in Combined Seeder and Fertilizer-Distributers, of which the following is a specification.

This invention relates to improvements in seeders and more particularly to the type which drops both seed and fertilizer.

The main object of the invention is to provide a machine of this character having a rotary member so constructed as to accurately drop all sizes of seeds in both hills and drills and which also operates as a supporting wheel for the machine.

Another object is to provide a machine of this character so constructed that the fertilizer can be dropped simultaneously with the seed or alternately therewith.

Another object is to so construct a machine of this character that the speed with which it is propelled will not in any way affect the distribution of its contents, and which may be so accurately adjusted that no thinning of the plants will be necessary.

Another object is to so construct the machine that each and every seed will drop directly in the drill.

With the foregoing and other objects in view, which will appear as the description proceeds, the invention resides in the combination and arrangement of parts and in the details of construction hereinafter described and claimed, it being understood that changes in the embodiment of the invention herein disclosed may be made within the scope of what is claimed without departing from the spirit of the invention.

In the accompanying drawing:—

Figure 1 is a transverse vertical section of a combined seeder and fertilizer distributer constructed in accordance with this invention.

Fig. 2 is an enlarged side view of the seeder portion of the machine with parts broken out.

Fig. 3 is a side elevation of the fertilizer distributing portion of the machine taken from the inside.

In the embodiment illustrated an axle 6 is revolubly mounted in a frame indicated at 1 the ends thereof being journaled in the side bars of the frame intermediately of its ends.

Fixed to this axle 6 is the combined seeder and fertilizer distributer 10 constituting this invention the ends of which are rigidly clamped to the axle 6 by lock nuts as indicated by 7, said axle passing transversely through the center of the seeder.

The combined seeder and fertilizer distributer drum 10 is substantially cylindrical in form and is composed preferably of two sections 11 and 12, each in the form of a frustrum of a cone and constructed of sheet metal or other suitable material and closed at their smaller ends, and open at their large ends, the latter being disposed toward each other. The outwardly flared side walls 13 and 14 of these sections are equipped at their edges with outwardly projecting lateral annular flanges 15 and 16, which form means of securing the two sections together.

A partition 17 is arranged in the drum 10 dividing it into a seed containing chamber 20, and a fertilizer containing chamber 21. This partition 17 is of greater diameter than the larger ends of the sections 11 and 12 and projects peripherally beyond the flanges 15 and 16 thereof as is shown clearly in Fig. 1, thus providing an annular furrow opener 18 the object of which will be presently more fully described.

The body portion of the partition 17 is preferably offset at points spaced from its periphery as shown at 19 so that when in assembled position the seed chamber 20 formed thereby will be smaller than the fertilizer chamber 21 as it is desirable to carry more fertilizer than seed during the operation of the machine.

The closed end or head of section 11 which constitutes the end of the seed chamber 20 has a filling opening 22 therein equipped with a suitable closure here shown in the form of a hinged door 23. The section 12 which constitutes the outer end of the chamber 21 is similarly provided with an opening 24 and closure 25 to afford access to the interior of the chamber, and to permit it to be filled when necessary.

The flared side walls of the chambers 20 and 21 are each provided adjacent their flanged peripheries with a plurality of peripherally alined spaced openings. The wall 13 of the seed chamber 20 has any desired number of spaced openings 26 to meet the requirements to which the machine is to be put.

Spaced inwardly from the annular series of openings 26 are two apertures 27 of different sizes, and at diametrically opposite points are disposed two similar openings 27' to provide for the dropping of the seeds twice during each revolution of the drum. Another opening 28 is arranged between the pairs of openings 27 and 27' and is designed for dropping seed once during each revolution of the drum.

Valves for controlling the openings in sections 11 and 12 are shown in the form of bands or rings 30 and 40 adjustably mounted on the outer faces of said sections and conforming in shape thereto. These bands are mounted to turn on the section and are adjustably held by any suitable means, bolts 29 having wing nuts 29' being here shown for this purpose, said nuts overlapping the edges of the bands and being designed to clampingly hold them in engagement with the sections. These bands 30 and 40 are provided adjacent their peripheral edges with a plurality of peripherally alined spaced openings the band 30 mounted on the section 11 having openings 31 therein in graduated series, seven openings being shown in each series which gradually increase in size from the smallest opening at one end of the series to the largest at the other end thereof although obviously the arrangement of the openings may be varied according to the use to which the machine is to be put. This band 30 is also provided at diametrically opposite points with two pairs of apertures 32 and 33 which are positioned to register with the openings 27 and 27' of section 11 when the band is turned a sufficient distance to cause this registration, and when these openings are so positioned the openings 31 of said band will be out of register with the openings 26 in the section 11 so that the only outlet to the chamber 20 will be through the registering pairs of openings in the band and section thereby providing for the dropping of seed or other contents of said section twice during one revolution of the drum. This band 30 is also provided with an aperture 34 which is designed to register when the band is peripherally turned with the aperture 28 in section 11 and when these apertures are in register the other apertures in said band and section will be out of register so that the contents of section 11 will be discharged through the registering openings 28 and 34 once during each revolution of the drum.

By arranging the openings 31 and graduating them in the manner above described seeds of varying sizes from the smallest flower seed may be discharged through these openings, it being understood that the band or valve 30 is turned to bring the openings therein through which it is desired to feed the seed into register with the openings 26 in the section below. The largest openings of the series 31 are disposed apart a distance corresponding to the distance between the openings 26 to provide for the registration of the large openings with the openings 26 when the band is positioned for this purpose. A slight turning of this band to the left brings the next largest opening of the series 31 into register with the openings 26 in the section below it, it being understood that the wing nuts 29' are first loosened to permit the turning of the band and after it has been adjusted to the desired extent they are tightened up to clamp and hold it against further turning.

The section 12 of the drum has peripheral openings 26' arranged adjacent its larger end these openings being of any desired number or any desired size. It is to be understood however that the size and shape of these openings may be varied to suit the use to which the machine is to be put.

The valve or band 40 which fits over and turns on the section 12 is constructed similarly to band 30 and is held in adjusted position on said section by similar means. This band 40 is provided adjacent its periphery with a plurality of series of peripherally alined openings 41, three openings being shown in each of the series and increasing in size from one end of the series to the other. The largest openings of the series are spaced apart a distance corresponding to the distance between the openings 26' in section 12 so that by proper turning of the band 40 the largest openings of the series 41 may be brought into register with the openings 26 in section 12 and through which the contents of the chamber 20 may be discharged. This band 40 by turning it toward the right in the same manner as that above described relative to band 30 will bring the next largest sized opening of the series 40 into register with the apertures 26' of section 12 so that by proper turning and adjusting of band 40 the contents of chamber 20 may be discharged in regulated quantities.

While compartment 21 is referred to as the fertilizer compartment and the compartment 20 as the seed compartment obviously seed or fertilizer may be fed from either one or the other of these compartments or from both as may be found desirable.

The drum 10 in addition to containing and dropping the seed and fertilizer also operates as a supporting wheel for the machine and when the machine is moved over a field or other surface this drum will revolve and discharge the contents from the chambers thereof according to the disposition of the valves 30 and 40 which operate to regulate the quantities and time in which the contents shall be discharged.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. In a machine of the class described, a revoluble substantially cylindrical drum, a partition extending transversely of said drum and projecting beyond the periphery thereof, said drum having apertures in its side walls on opposite sides of said partition, and bands adjustably mounted on said side walls over said apertures and having openings to register with the openings in the side walls on the turning of the bands at predetermined distance, and means for holding said bands in adjusted position.

2. In a seed planter and fertilizer distributer, a revoluble drum composed of two sections each in the form of a frustrum of a cone closed at their truncated ends, and open at their other ends, the open ends of said sections being disposed toward each other, a partition clamped between said open ends, said partition having the major portion thereof offset to form chambers of differen sizes in said drum, and valve controlled openings in said sections adjacent said partition.

3. In a seed planter and fertilizer distributer, a revoluble drum composed of two sections, each in the form of a frustrum of a cone closed at their truncated ends and open at their other ends, the open ends of said sections being disposed toward each other and secured together, said sections having openings adjacent their adjoined edges, and bands movably mounted on the outer faces of said sections over said openings and having openings positioned to register with the section openings on the turning of said bands.

4. In a seed planter and fertilizer distributer, a revoluble drum composed of two sections, each in the form of a frustrum of a cone closed at their truncated ends and open at their other ends, the open ends of said sections being disposed toward each other and secured together, said sections having openings adjacent their adjoined edges, and bands movably mounted on the outer faces of said sections over said openings and having a plurality of peripherally alined series of openings adapted to register with the section openings on the turning of said band, the openings in each series being graduated to discharge regular quantities of the contents of said drum.

5. In a seed planter and fertilizer distributer, a revoluble drum composed of two sections, each in the form of a frustrum of a cone closed at their truncated ends and open at their other ends, the open ends of said sections being disposed toward each other and secured together, said sections having openings adjacent their adjoined edges, and bands movably mounted on the outer face of said sections over said openings and having a plurality of peripherally alined series of openings adapted to register with the section openings on the turning of said bands, and means for holding said bands in adjusted position.

6. In a seed planter and fertilizer distributer, a revoluble drum composed of two sections, each in the form of a frustrum of a cone closed at their truncated ends and open at their other ends, the open ends of said sections being disposed toward each other and secured together, said sections having openings adjacent their adjoined edges, bands movably mounted on the outer faces of said sections over said openings and having a plurality of peripherially alined series of openings adapted to register with the section openings on the turning of said bands, means for holding said bands in adjusted position, one of said bands and one of said sections also having openings at diametrically opposite points to provide for the dropping of the contents of said sections twice during each revolution of the drum.

In testimony whereof I affix my signature.

ERVIN H. HITCHCOCK.